United States Patent
Fujii et al.

(10) Patent No.: US 10,763,765 B2
(45) Date of Patent: Sep. 1, 2020

(54) BRAKE CONTROL SYSTEM AND METHOD OF FAULT DETECTION

(71) Applicant: FANUC CORPORATION, Yamanashi (JP)

(72) Inventors: Shouta Fujii, Yamanashi-ken (JP); Tsutomu Shikagawa, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/258,926

(22) Filed: Jan. 28, 2019

(65) Prior Publication Data

US 2019/0238070 A1  Aug. 1, 2019

(30) Foreign Application Priority Data

Jan. 29, 2018  (JP) ................ 2018-012151

(51) Int. Cl.
*G06F 1/10* (2006.01)
*H02P 3/04* (2006.01)
(Continued)

(52) U.S. Cl.
CPC ............ *H02P 3/04* (2013.01); *B25J 19/0004* (2013.01); *F16D 63/002* (2013.01);
(Continued)

(58) Field of Classification Search
CPC ............ G05B 2219/41279; H02P 3/04; H02P 2205/01; H02P 29/04
See application file for complete search history.

(56) References Cited

U.S. PATENT DOCUMENTS 9,329,023 B2   5/2016  Kunida et al.
2009/0216372 A1  8/2009  Watanabe et al.
2019/0101175 A1*  4/2019  Chandrasekara ..... F16D 66/024

FOREIGN PATENT DOCUMENTS

DE   10149604 A1   4/2003
DE   10147817 A1   5/2003
(Continued)

OTHER PUBLICATIONS

English Abstract and Machine Translation for Japanese Publication No. 2017-034856 A, published Feb. 9, 2017, 7 pgs.
(Continued)

*Primary Examiner* — Karen Masih
(74) *Attorney, Agent, or Firm* — Fredrikson & Byron, P.A.

(57) ABSTRACT

A brake control system includes: a plurality of motors each provided with a brake device and a position detecting section; and a brake control device that controls a plurality of the brake devices using one brake-oriented power source. The position detecting section includes a position detecting circuit section and a communication circuit section. The brake device includes: a current detecting section that detects a brake current flowing through a brake coil of an electromagnetic brake; and an insulating circuit section that electrically insulates the current detecting section and the communication circuit section. The communication circuit section transmits to the brake control device the brake current acquired via the insulating circuit section. The brake control device includes a fault specifying section that specifies the faulty brake device based on a plurality of detection signals detected by a plurality of the current detecting sections.

12 Claims, 5 Drawing Sheets

(51) Int. Cl.
*B25J 19/00* (2006.01)
*F16D 63/00* (2006.01)
*F16D 66/02* (2006.01)
*F16D 121/20* (2012.01)

(52) U.S. Cl.
CPC ........ *F16D 66/021* (2013.01); *F16D 2121/20* (2013.01); *H02P 2203/09* (2013.01); *H02P 2205/01* (2013.01)

(56) References Cited

FOREIGN PATENT DOCUMENTS

| | | | |
|---|---|---|---|
| DE | 102015001203 A1 | 8/2016 | |
| JP | 2001269892 A | 10/2001 | |
| JP | 2004306159 A | 11/2004 | |
| JP | 2009196031 A | 9/2009 | |
| JP | 2009281913 A | 12/2009 | |
| JP | 2016222372 A | 12/2016 | |
| JP | 201734856 A | 2/2017 | |
| JP | 2017185595 A | 10/2017 | |
| JP | 2019126107 A | 7/2019 | |
| WO | 2005035205 A1 | 4/2005 | |
| WO | 2007073831 A1 | 7/2007 | |

OTHER PUBLICATIONS

English Abstract and Machine Translation for Japanese Publication No. 2019-126107 A, published Jul. 25, 2019, 12 pgs.
English Abstract and Machine Translation for Japanese Publication No. 2004-306159 A, published Nov. 4, 2004, 5 pgs.
English Abstract for International Publication No. WO2005035205 A1, published Apr. 21, 2005, 2 pgs. (including English Machine Translation for Japanese Republication No. JPWO2005035205 A1, published Dec. 21, 2006, 7 pgs).
English Abstract for Japanese Publication No. 2009196031 A, published Sep. 3, 2009, 1 pg.
English Abstract and Machine Translation for Japanese Publication No. 2017-185595 A, published Oct. 12, 2017, 11 pgs.
English Abstract and Machine Translation for Japanese Publication No. 2016-222372 A, published Dec. 28, 2016, 12 pgs.
English Abstract and Machine Translation for Japanese Publication No. 2009-281913 A, published Dec. 3, 2009, 8 pgs.
English Abstract and Machine Translation for Japanese Publication No. 2001-269892 A, published Oct. 2, 2001, 7 pgs.
English Abstract and Machine Translation for German Publication No. 10149604 A1, published Apr. 10, 2003, 36 pages.
English Abstract and Machine Translation for German Publication No. 10147817 A1, published May 8, 2003, 21 pages.
English Abstract and Machine Translation for International Publication No. WO2007073831 A1, published Jul. 5, 2007, 15 pages.
English Abstract and Machine Translation for German Publication No. 102015001203 A1, published Aug. 4, 2016, 23 pages.

* cited by examiner

BRAKE CONTROL SYSTEM AND METHOD OF FAULT DETECTION

CROSS-REFERENCE TO RELATED APPLICATION

This application is based upon and claims the benefit of priority from Japanese Patent Application No. 2018-012151 filed on Jan. 29, 2018, the contents of which are incorporated herein by reference.

BACKGROUND OF THE INVENTION

Field of the Invention

The present invention relates to a brake control system and a method of fault detection for detecting a fault in a plurality of brake devices provided to a plurality of motors.

Description of the Related Art

Japanese Laid-Open Patent Publication No. 2016-222372 discloses an abnormality detecting device that acquires a signal indicating a current flowing in an electromagnetic brake, and judges whether or not the electromagnetic brake is in an abnormal state based on the acquired signal.

SUMMARY OF THE INVENTION

Here, sometimes, in a machine tool or a robot, a plurality of brake devices provided to a plurality of motors are controlled by one motor drive device. In this case, if the likes of a power source for supplying a current to the brake device and a current sensor for detecting a current supplied to the brake device are provided to each brake device, then costs are incurred. Therefore, there is a demand for these configuring components to be commonly utilized. In other words, there is a demand for the plurality of brake devices to be controlled using one brake-oriented power source and for a fault of the brake device to be detected based on a current value outputted from the one brake-oriented power source.

However, although an abnormality of a brake device can be detected even when the likes of the power source and the current sensor are commonly utilized, it cannot be specified which brake device has the abnormality because a current value from one brake-oriented power source is detected by one current sensor.

Accordingly, the present invention has an object of providing a brake control system and a method of fault detection that allow a faulty brake device to be specified while suppressing costs.

A first aspect of the present invention is a brake control system including: a plurality of motors each provided with a brake device and a position detecting section; and a brake control device that controls a plurality of the brake devices using one brake-oriented power source, the position detecting section including: a position detecting circuit section that detects a rotational position of a rotating shaft of the motor; and a communication circuit section that transmits the rotational position to the brake control device, the brake device including: an electromagnetic brake that has a brake coil and releases braking of the rotating shaft of the motor by electrification of the brake coil; a detecting section that detects at least one of a brake current flowing through the brake coil and a brake voltage applied to the brake coil; and an insulating circuit section provided between the detecting section and the communication circuit section in order to electrically insulate the detecting section and the communication circuit section and transmit to the brake control device via the communication circuit section a detection signal detected by the detecting section, and the brake control device including a fault specifying section that specifies the faulty brake device based on a plurality of detection signals detected by a plurality of the detecting sections.

A second aspect of the present invention is a method of fault detection by which a brake control system detects a fault of a brake device, the brake control system including: a plurality of motors each provided with the brake device and a position detecting section, the brake device having a brake coil and releasing braking of a rotating shaft of the motor by electrification of the brake coil, and the position detecting section detecting a rotational position of the rotating shaft; and a brake control device that controls a plurality of the brake devices using one brake-oriented power source, the method including: a detecting step by which a detecting section provided to each of a plurality of the brake devices detects at least one of a brake current flowing through the brake coil and a brake voltage applied to the brake coil; a transmitting step by which the position detecting section, as well as transmitting the detected rotational position to the brake control device, acquires via an insulating circuit section a plurality of detection signals detected in the detecting step and transmits an acquired plurality of the detection signals to the brake control device; and a fault specifying step by which a fault specifying section of the brake control device specifies the faulty brake device based on a plurality of the detected signals detected in the detecting step.

The present invention makes it possible to specify a faulty brake device while suppressing costs.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a brake control system and a method of fault detection according to the present invention will be presented and described in detail below with reference to the accompanying drawings.

EMBODIMENT

Figure 1:
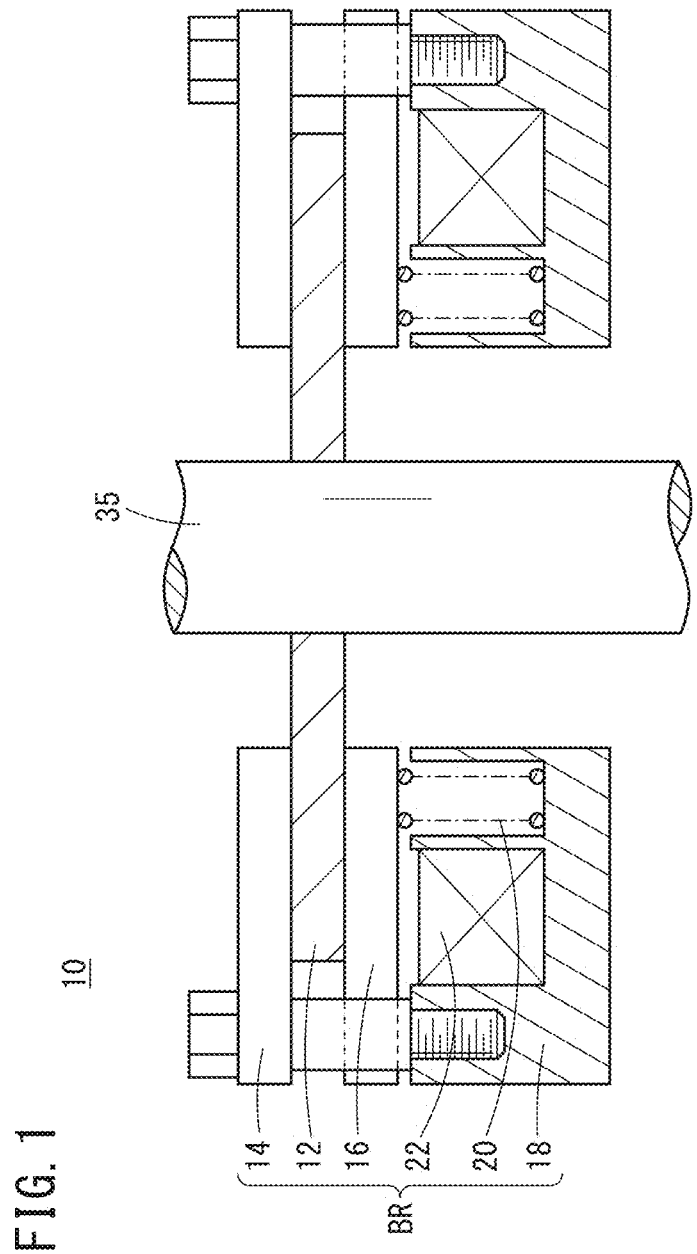
FIG. 1 is a view showing a schematic configuration of an electromagnetic brake employed in the embodiment.

FIG. 1 is a view showing a schematic configuration of an electromagnetic brake 10 employed in the embodiment. The electromagnetic brake 10 includes a friction plate 12, an end plate 14, an armature 16, a core 18, a spring 20, and a brake coil 22.

Figure 2:
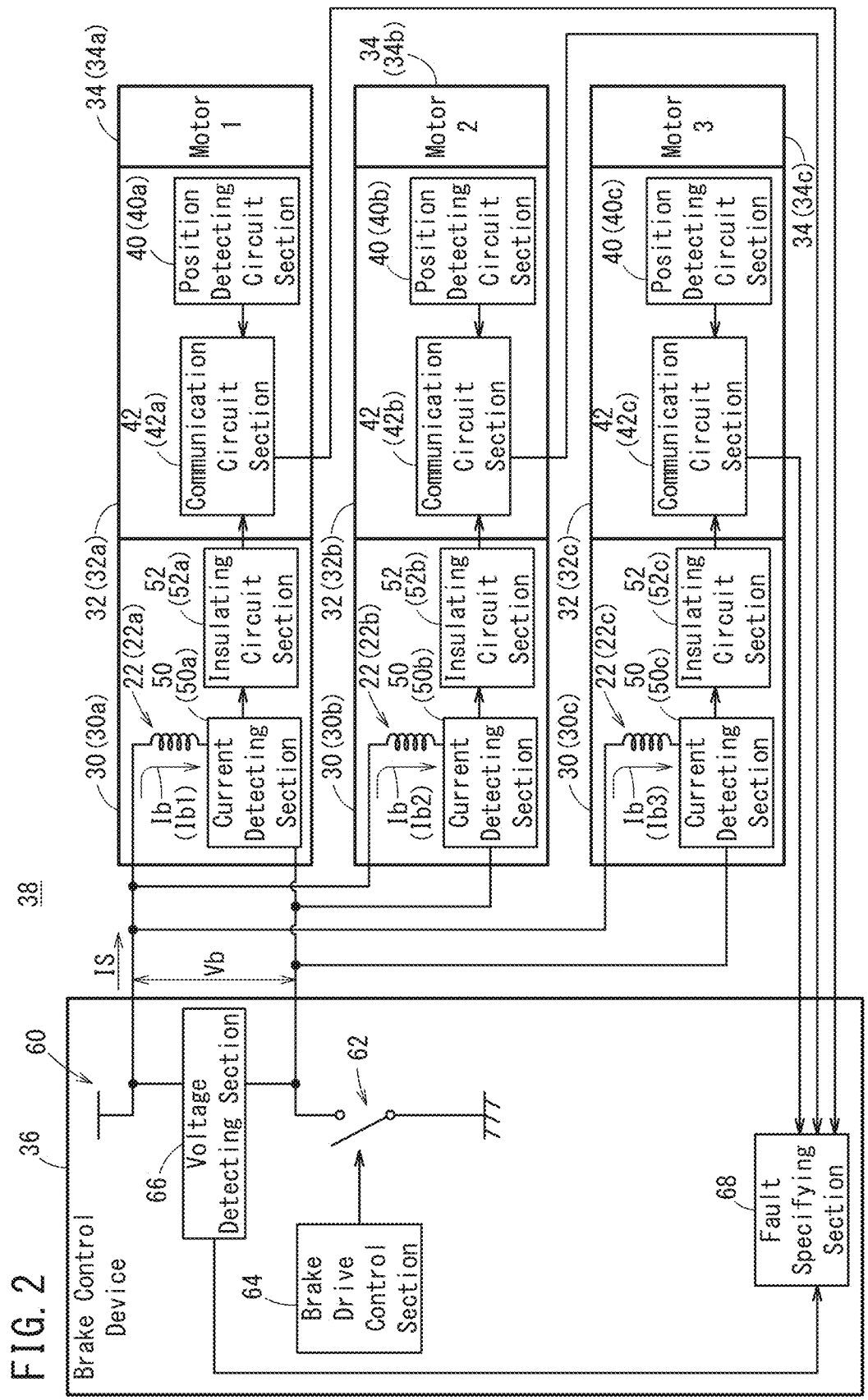
FIG. 2 is a view showing an overall electrical configuration of a brake control system employing the electromagnetic brake shown in FIG. 1.

The friction plate 12 is attached to a rotating shaft 35 of a motor 34 shown in FIG. 2, and rotates together with the rotating shaft 35 around the rotating shaft 35. The friction plate 12 is provided between the end plate 14 and the armature 16. The core 18 is provided on an opposite side to a friction plate 12 side of the armature 16. The spring 20 is provided to the core 18, and biases the armature 16 toward the friction plate 12 side. Due to a biasing force of this spring 20, the friction plate 12 is sandwiched by the end plate 14 and the armature 16, and rotation of the friction plate 12 (rotating shaft 35) is braked.

The brake coil 22 is provided to the core 18. The core 18 and the brake coil 22 configure an electromagnet. A magnetic force is generated by electrification of the brake coil 22. By the biasing force of the spring 20 being overcome by an attractive force due to this magnetic force, the armature 16 is attracted to the core 18. As a result, the friction plate 12 is released, and the friction plate 12 (rotating shaft 35) becomes able to rotate.

FIG. 2 is a view showing an overall electrical configuration of a brake control system 38 including: a plurality of the motors 34 each provided with a brake device 30 having the electromagnetic brake 10 described by FIG. 1 and a position detecting section 32; and one brake control device 36 that controls the plurality of motors 34. The brake control device 36 controls the plurality of brake devices 30 to brake the plurality of motors 34. This brake control device 36 may be provided to a motor drive device (for example, a servo amplifier, or the like) for driving the plurality of motors 34.

In the present embodiment, the number of motors 34 is set to three in order to make the description easy to understand. Therefore, the number of brake devices 30 will also be three. Note that in order to distinguish from one another the three motors 34, the three motors 34 are sometimes expressed by 34a, 34b, 34c. Moreover, the brake device 30 and position detecting section 32 provided to the motor 34a are sometimes expressed by 30a, 32a, the brake device 30 and position detecting section 32 provided to the motor 34b are sometimes expressed by 30b, 32b, and the brake device 30 and position detecting section 32 provided to the motor 34c are sometimes expressed by 30c, 32c.

Note that the brake coils 22 of the three brake devices 30 (30a-30c) are connected in parallel to each other.

The three position detecting sections 32 (32a-32c) have the same configurations as one another, and each include a position detecting circuit section 40 and a communication circuit section 42. The position detecting circuit section 40 detects a rotational position of the rotating shaft 35 of the motor 34. The communication circuit section 42 transmits to the brake control device 36 the rotational position detected by the position detecting circuit section 40.

In order to distinguish from one another the position detecting circuit sections 40 and communication circuit sections 42 of each of the position detecting sections 32 (32a-32c), the position detecting circuit section 40 and communication circuit section 42 of the position detecting section 32a are sometimes called 40a, 42a, the position detecting circuit section 40 and communication circuit section 42 of the position detecting section 32b are sometimes called 40b, 42b, and the position detecting circuit section 40 and communication circuit section 42 of the position detecting section 32c are sometimes called 40c, 42c.

Therefore, the position detecting circuit section 40a detects the rotational position of the rotating shaft 35 of the motor 34a, and the communication circuit section 42a transmits to the brake control device 36 the rotational position detected by the position detecting circuit section 40a. Similarly, the communication circuit section 42b transmits to the brake control device 36 the rotational position of the rotating shaft 35 of the motor 34b detected by the position detecting circuit section 40b, and the communication circuit section 42c transmits to the brake control device 36 the rotational position of the rotating shaft 35 of the motor 34c detected by the position detecting circuit section 40c.

The three brake devices 30 (30a-30c) have the same configurations as one another, and each further include a current detecting section (detecting section) 50 and an insulating circuit section 52. The current detecting section 50 detects a brake current Ib flowing through the brake coil 22. The insulating circuit section 52 electrically insulates the current detecting section 50 and the communication circuit section 42, and outputs to the communication circuit section 42 a detection signal indicating the brake current Ib detected by the current detecting section 50. This insulating circuit section 52 is provided between the current detecting section 50 and the communication circuit section 42.

This current detecting section (detecting section) 50 may be a current sensor having a shunt resistor, for example, and the insulating circuit section 52 may be an insulating-type A/D converter. Moreover, the current detecting section 50 and the insulating circuit section 52 may be configured by a Hall element-type current sensor.

Now, in order to distinguish from one another the current detecting sections 50 and insulating circuit sections 52 of each of the brake devices 30 (30a-30c), the current detecting section 50 and insulating circuit section 52 of the brake device 30a are sometimes called 50a, 52a, the current detecting section 50 and insulating circuit section 52 of the brake device 30b are sometimes called 50b, 52b, and the current detecting section 50 and insulating circuit section 52 of the brake device 30c are sometimes called 50c, 52c.

Therefore, the current detecting section 50a detects the brake current Ib (Ib1) flowing through the brake coil 22 (22a) of the brake device 30a, and the insulating circuit section 52a electrically insulates the current detecting section 50a and the communication circuit section 42a and outputs to the communication circuit section 42a the detected detection signal. The current detecting section 50b detects the brake current Ib (Ib2) flowing through the brake coil 22 (22b) of the brake device 30b, and the insulating circuit section 52b electrically insulates the current detecting section 50b and the communication circuit section 42b and outputs to the communication circuit section 42b the detected detection signal. The current detecting section 50c detects the brake current Ib (Ib3) flowing through the brake coil 22 (22c) of the brake device 30c, and the insulating circuit section 52c electrically insulates the current detecting section 50c and the communication circuit section 42c and outputs to the communication circuit section 42c the detected detection signal.

Note that since a large current flows into the brake coil 22, the current detecting section 50 will be a strong current circuit, and the communication circuit section 42 will be a weak current circuit. Therefore, the insulating circuit section 52 is provided between the current detecting section 50 and the communication circuit section 42.

Each of the plurality of communication circuit sections 42 (42a-42c) transmits the detection signal detected by the current detecting section 50 (50a-50c) via the insulating circuit section 52 (52a-52c), to the brake control device 36.

For example, the communication circuit section 42a transmits the detection signal detected by the current detecting section 50a via the insulating circuit section 52a, to the brake control device 36. As a result, the brake control device 36 can acquire the three brake currents Ib flowing through the brake coils 22 (22a-22c) of the three brake devices 30.

The brake control device 36 includes a brake-oriented power source 60, a switch 62, a brake drive control section 64, a voltage detecting section 66, and a fault specifying section 68.

The brake-oriented power source 60 is a direct current power source for supplying a current to the brake coils 22 (22a-22c) of the three brake devices 30 (30a-30c). The switch 62 switches whether or not to supply the brake coils 22 (22a-22c) of the three brake devices 30 (30a-30c) with the current from the brake-oriented power source 60. A size of a current IS supplied from the brake-oriented power source 60 is equal to the sum of the brake currents Ib (Ib1-Ib3) flowing through the brake coils 22 (22a-22c) of each of the three brake devices 30 (30a-30c) (IS=Ib1+Ib2+Ib3).

The brake drive control section 64 controls the switch 62, thereby controlling braking of the three motors 34 (34a-34c) by the three brake devices 30 (30a-30c). In the case of releasing braking of the three motors 34 (34a-34c), the brake drive control section 64 sets the switch 62 to ON. As a result, the brake currents Ib (Ib1-Ib3) are supplied from one brake-oriented power source 60 to each of the brake coils 22 (22a-22c) of the three brake devices 30 (30a-30c), whereby the rotating shafts 35 of the three motors 34 (34a-34c) become rotatable. Moreover, in the case of braking the three motors 34 (34a-34c), the brake drive control section 64 sets the switch 62 to OFF. As a result, supply of the brake currents Ib (Ib1-Ib3) to the brake coils 22 (22a-22c) of the three brake devices 30 (30a-30c) is cut off, and the rotating shafts 35 of the three motors 34 (34a-34c) are braked.

The voltage detecting section 66 detects a brake voltage Vb applied to the brake coils 22 (22a-22c) of the three brake devices 30 (30a-30c). The brake coils 22 (22a-22c) are connected in parallel to each other, so, in principle, voltages of each of the brake coils 22 (22a-22c) are equal to the brake voltage Vb.

The fault specifying section 68 specifies the brake device 30 which is faulty (hereafter, sometimes called a faulty brake device 30F), based on the detection signals detected by the current detecting sections 50 (50a-50c) of the three brake devices 30 (30a-30c). The fault specifying section 68 may specify the faulty brake device 30F taking into consideration also the brake voltage Vb detected by the voltage detecting section 66.

The brake device 30 becomes faulty by the brake coil 22 short-circuiting or undergoing a wiring break. Therefore, values greatly differ for the brake current Ib flowing in the brake coil 22 of the brake device 30 which is faulty and the brake current Ib flowing in the brake coil 22 of the brake device 30 which is not faulty. Therefore, the faulty brake device 30F can be specified based on the brake currents Ib flowing through the brake coils 22 (22a-22c) of each of the brake devices 30 (30a-30c). Judgement of whether or not the brake device 30 is faulty based on the likes of this brake current Ib is well-known technology, so description of a method of specifying the faulty brake device 30F will be omitted. Note that if the brake coil 22 short-circuits or undergoes a wiring break, then, even when the switch 62 is set to ON, a current does not flow in the brake coil 22, hence braking of the motor 34 is not released.

Figure 3:
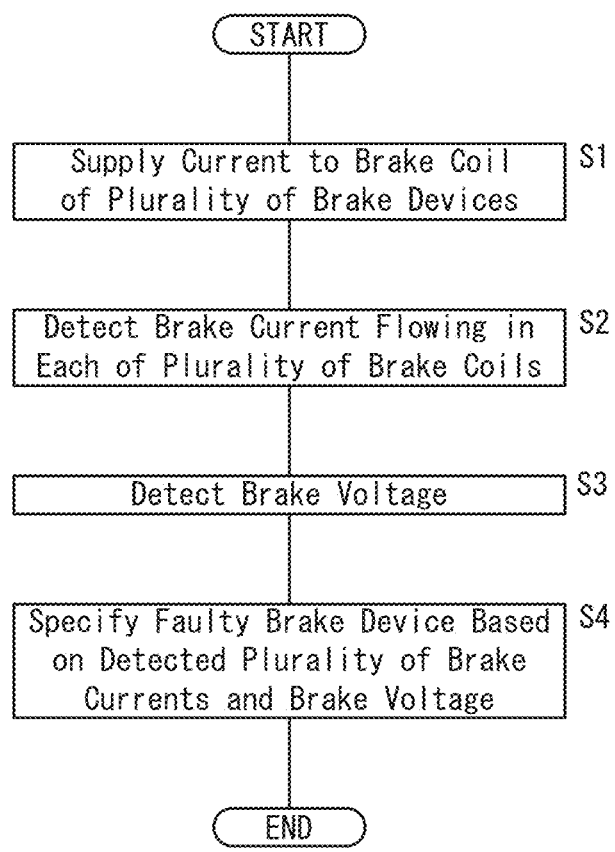
FIG. 3 is a flowchart showing operation of the brake control system shown in FIG. 2.

Next, operation of the brake control system 38 will be described following the flowchart shown in FIG. 3. In step S1, the brake drive control section 64 sets the switch 62 to ON, and thereby supplies a current to the brake coils 22 (22a-22c) of the plurality of brake devices 30 (30a-30c). Braking of the motor 34 provided with the non-faulty brake device 30 is released by electrification of this break coil 22.

Next, in step S2, the plurality of current detecting sections 50 (50a-50c) detect the brake currents Ib (Ib1-Ib3) flowing in each of the plurality of brake coils 22 (22a-22c) of the plurality of brake devices 30 (30a-30c).

Next, in step S3, the voltage detecting section 66 detects the brake voltage Vb applied to the brake coils 22 (22a-22c) of the plurality of brake devices 30 (30a-30c).

Next, in step S4, the fault specifying section 68 specifies the faulty brake device 30F based on the plurality of brake currents Ib (Ib1-Ib3) detected in step S2 and the brake voltage Vb detected in step S3.

Since the brake-oriented power source 60, the switch 62, and the brake drive control section 64 have been commonly utilized enabling there to be only one of each, and since each of the brake devices 30 has been provided with the current detecting section 50 in this way, the brake device 30 which is faulty can be specified while suppressing costs.

Moreover, generally, the position detecting section 32 is provided with the communication circuit section 42 for transmitting to the brake control device 36 the detection signal (the signal indicating the rotational position) detected by the position detecting circuit section 40. Therefore, by using this communication circuit section 42 provided to the position detecting section 32 to transmit to the brake control device 36 the detection signal indicating the brake current Ib, costs can be further suppressed.

Now, when the brake device 30 is faulty, the motor 34 ends up rotating in a state of its braking being unreleased, hence life of the friction plate 12 shortens. In addition, when the brake device 30 is faulty, an actual speed of the motor 34 will sometimes be slower than an instructed speed, so that an excess current ends up being passed through the motor 34. However, in the present embodiment, the faulty brake device 30 can be specified (detected), hence it can be prevented that an excess current is passed through the motor, and it can be prevented that life of the friction plate 12 shortens.

MODIFIED EXAMPLES

The above-described embodiment may also be modified as shown below.

Modified Example 1

In the above-described first embodiment, each of the brake devices 30 (30a-30c) was provided with the current detecting section 50, and the brake control device 36 was provided with one voltage detecting section 66. However, in modified example 1, each of the brake devices 30 (30a-30c) is provided with a voltage detecting section (detecting section) 70 instead of the current detecting section 50, and the brake control device 36 is provided with one current detecting section 72 instead of the one voltage detecting section 66.

Figure 4:
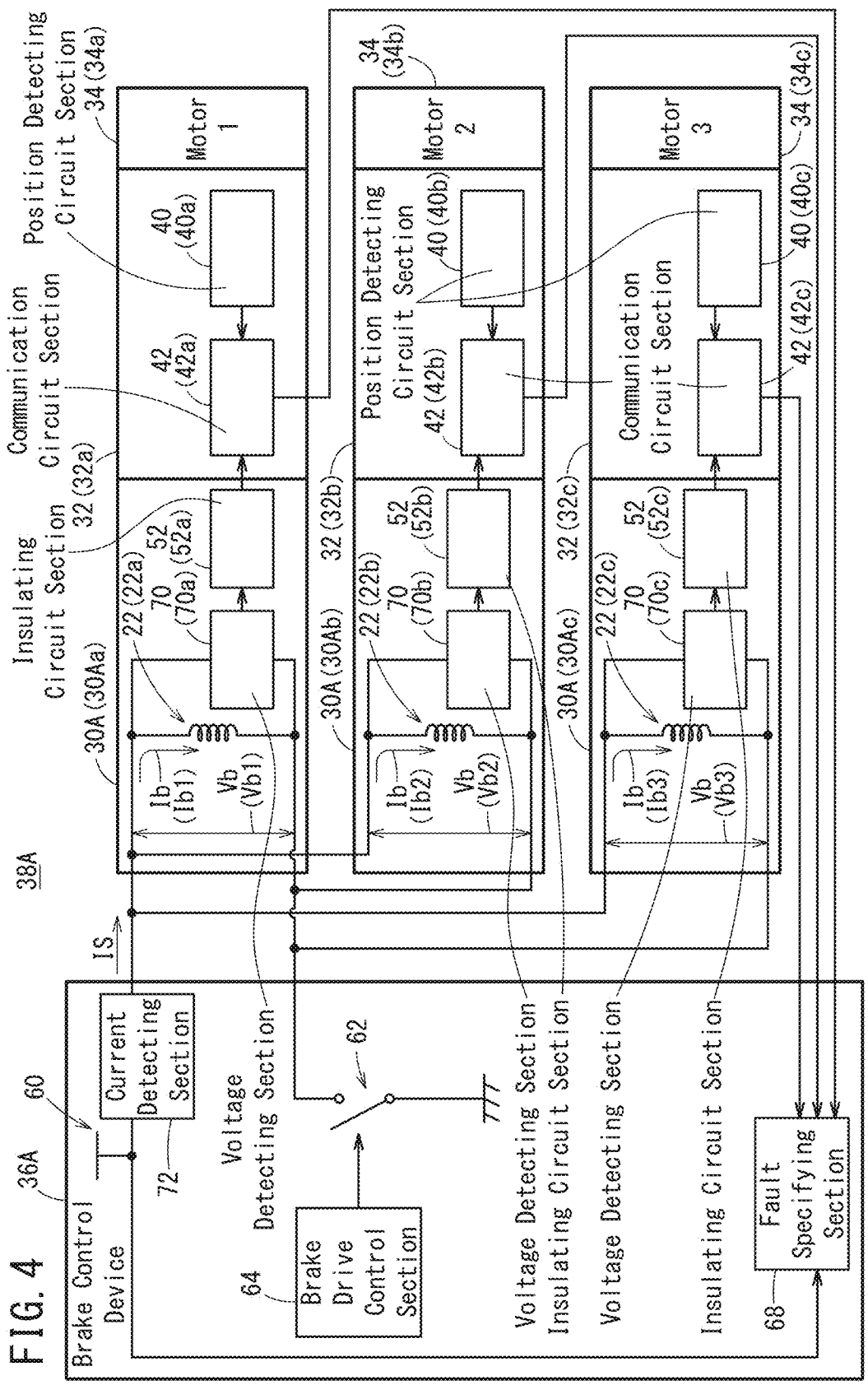
FIG. 4 is a view showing an overall electrical configuration of a brake control system in modified example 1.

FIG. 4 is a view showing an overall electrical configuration of a brake control system 38A in modified example 1. Note that configurations similar to those of the above-described embodiment will be assigned with the same reference symbols as those assigned in the above-described embodiment, and descriptions thereof will be omitted. Brake devices 30A (30Aa-30Ac) in modified example 1 have the same configuration as the brake devices 30 (30a-30c) described in the above-described embodiment, apart from being provided with the voltage detecting section 70 instead of the current detecting section 50. Moreover, a brake control device 36A in modified example 1 has the same configuration as the brake control device 36 described in the above-described embodiment, apart from being provided with one current detecting section 72 instead of the voltage detecting section 66.

This voltage detecting section (detecting section) 70 may be a voltage sensor having a shunt resistor, for example. Moreover, the voltage detecting section 70 and the insulating circuit section 52 may be configured by a Hall element-type voltage sensor.

The voltage detecting section 70 detects the brake voltage Vb applied to the brake coil 22 (22a) of the brake device 30A. In order to distinguish from one another the voltage detecting sections 70 of each of the brake devices 30A (30Aa-30Ac), the voltage detecting section 70 of the brake device 30Aa will be called 70a, the voltage detecting section 70 of the brake device 30Ab will be called 70b, and the voltage detecting section 70 of the brake device 30Ac will be called 70c.

Therefore, the voltage detecting section 70a detects the brake voltage Vb (Vb1) applied to the brake coil 22a of the brake device 30Aa. Similarly, the voltage detecting section 70b detects the brake voltage Vb (Vb2) applied to the brake coil 22b of the brake device 30Ab, and the voltage detecting section 70c detects the brake voltage Vb (Vb3) applied to the brake coil 22c of the brake device 30Ac.

The brake voltages Vb (Vb1-Vb3) detected by the voltage detecting sections 70 (70a-70c) of each of these brake devices 30A (30Aa-30Ac) are transmitted to the brake control device 36A from the communication circuit sections 42 (42a-42c) after passing through the insulating circuit sections 52 (52a-52c).

The current detecting section 72 detects a current value of the current IS flowing into the three brake coils 22 (22a-22c) from the brake-oriented power source 60. The current value of the current IS detected by the current detecting section 72 is a current value of a current obtained by summing the brake currents Ib (Ib1-Ib3) flowing through each of the brake coils 22.

The fault specifying section 68 specifies the brake device 30A which is faulty (faulty brake device 30AF) based on the detection signals indicating the brake voltages Vb (Vb1-Vb3) detected by the voltage detecting sections 70 (70a-70c) of the three brake devices 30A (30Aa-30Ac). The fault specifying section 68 may specify the faulty brake device 30AF taking into consideration also the current IS detected by the current detecting section 72.

As mentioned above, the brake device 30A becomes faulty by the brake coil 22 short-circuiting or undergoing a wiring break. Therefore, values greatly differ for the brake voltage Vb of the brake coil 22 of the brake device 30A which is faulty and the brake voltage Vb of the brake coil 22 of the brake device 30A which is not faulty. Therefore, the faulty brake device 30AF can be specified based on the brake voltages Vb (Vb1-Vb3) of the brake coils 22 (22a-22c) of each of the brake devices 30A (30Aa-30Ac). Judgement of whether or not the brake device 30A is faulty based on the likes of this brake voltage Vb is well-known technology, so description of a method of specifying the faulty brake device 30AF will be omitted.

Since the brake-oriented power source 60, the switch 62, and the brake drive control section 64 have been commonly utilized enabling there to be only one of each, and since each of the brake devices 30A has been provided with the voltage detecting section 70 in this way, the brake device 30A which is faulty can be specified while suppressing costs.

Moreover, by using the communication circuit section 42 provided to the position detecting section 32 to transmit to the brake control device 36 the detection signal indicating the brake voltage Vb, costs can be further suppressed.

Modified Example 2

In the above-described first embodiment, each of the brake devices 30 (30a-30c) was provided with the current detecting section 50, and the brake control device 36 was provided with one voltage detecting section 66. However, in modified example 2, each of the brake devices 30 (30a-30c) is further provided with a voltage detecting section (detecting section) 80. In this case, the brake control device 36 need not be provided with the voltage detecting section 66.

Figure 5:
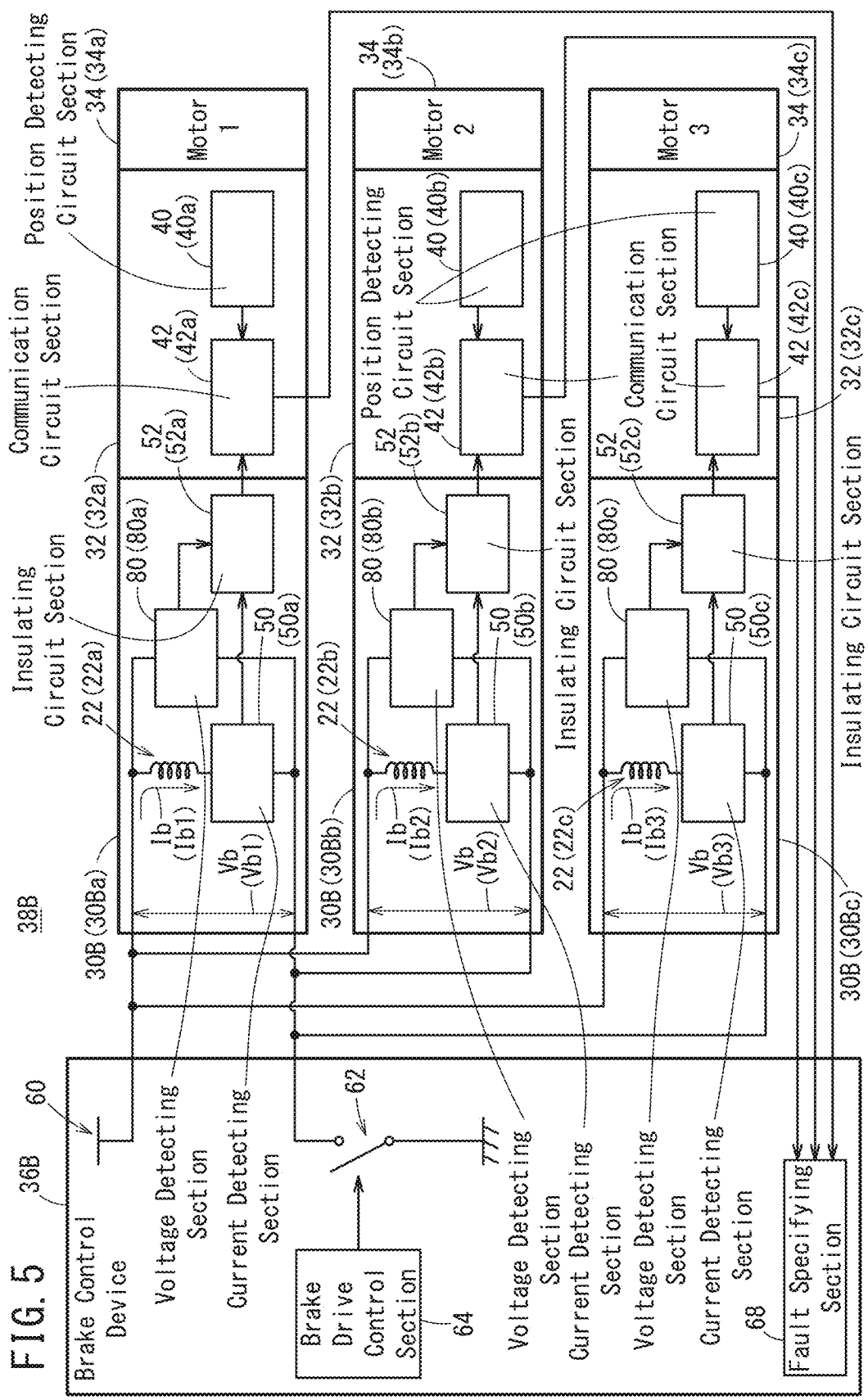
FIG. 5 is a view showing an overall electrical configuration of a brake control system in modified example 2.

FIG. 5 is a view showing an overall electrical configuration of a brake control system 38B in modified example 2. Note that configurations similar to those of the above-described embodiment will be assigned with the same reference symbols as those assigned in the above-described embodiment, and descriptions thereof will be omitted. Brake devices 30B (30Ba-30Bc) in modified example 2 have the same configuration as the brake devices 30 (30a-30c) described in the above-described embodiment, apart from being further provided with the voltage detecting section 80. Moreover, a brake control device 36B in modified example 2 has the same configuration as the brake control device 36 described in the above-described embodiment, apart from not being provided with the voltage detecting section 66.

This voltage detecting section (detecting section) 80 may be a voltage sensor having a shunt resistor, for example. Moreover, the current detecting section 50, the voltage detecting section 80, and the insulating circuit section 52 may be configured by a Hall element-type sensor.

The voltage detecting section 80 detects the brake voltage Vb applied to the brake coil 22 of the brake device 30B. In order to distinguish from one another the voltage detecting sections 80 of each of the brake devices 30B (30Ba-30Bc), the voltage detecting section 80 of the brake device 30Ba will be called 80a, the voltage detecting section 80 of the brake device 30Bb will be called 80b, and the voltage detecting section 80 of the brake device 30Bc will be called 80c.

Therefore, the voltage detecting section 80a detects the brake voltage Vb (Vb1) applied to the brake coil 22a of the brake device 30Ba. Similarly, the voltage detecting section 80b detects the brake voltage Vb (Vb2) applied to the brake coil 22b of the brake device 30Bb, and the voltage detecting section 80c detects the brake voltage Vb (Vb3) applied to the brake coil 22c of the brake device 30Bc.

The brake voltages Vb (Vb1-Vb3) detected by the voltage detecting sections 80 (80a-80c) of each of these brake devices 30B (30Ba-30Bc) are transmitted to the brake control device 36B from the communication circuit sections 42 (42a-42c) after passing through the insulating circuit sections 52 (52a-52c).

The fault specifying section 68 specifies the brake device 30B which is faulty (faulty brake device 30BF) based on at least one of the detection signals indicating the brake currents Ib (Ib1-Ib3) detected by the three current detecting sections 50 (50a-50c) and the detection signals indicating the brake voltages Vb (Vb1-Vb3) detected by the three voltage detecting sections 80 (80a-80c).

Since the brake-oriented power source 60, the switch 62, and the brake drive control section 64 have been commonly utilized enabling there to be only one of each, and since each of the brake devices 30B has been provided with the current detecting section 50 and the voltage detecting section 80 in this way, the brake device 30B which is faulty can be specified while suppressing costs.

Moreover, by using the communication circuit section 42 provided to the position detecting section 32 to transmit to the brake control device 36 the detection signals indicating the brake current Ib and the brake voltage Vb, costs can be further suppressed.

TECHNICAL IDEAS OBTAINED FROM EMBODIMENT

Technical ideas understandable from the above-described embodiment and modified examples 1 and 2 will be described below.

First Technical Idea

A brake control system (38, 38A, 38B) includes: a plurality of motors (34) each provided with a brake device (30, 30A, 30B) and a position detecting section (32); and a brake control device (36, 36A, 36B) that controls a plurality of the brake devices (30, 30A, 30B) using one brake-oriented power source (60). The position detecting section (32) includes: a position detecting circuit section (40) that detects a rotational position of a rotating shaft (35) of the motor (34); and a communication circuit section (42) that transmits the rotational position to the brake control device (36, 36A, 36B). The brake device (30, 30A, 30B) includes: an electromagnetic brake (10) that has a brake coil (22) and releases braking of the rotating shaft (35) of the motor (34) by electrification of the brake coil (22); a detecting section (50, 70, 80) that detects at least one of a brake current (Ib) flowing through the brake coil (22) and a brake voltage (Vb) applied to the brake coil (22); and an insulating circuit section (52) provided between the detecting section (50, 70, 80) and the communication circuit section (42) in order to electrically insulate the detecting section (50, 70, 80) and the communication circuit section (42) and transmit to the brake control device (36, 36A, 36B) via the communication circuit section (42) a detection signal detected by the detecting section (50, 70, 80). The brake control device (36, 36A, 36B) includes a fault specifying section (68) that specifies the faulty brake device (30, 30A, 30B) based on a plurality of detection signals detected by a plurality of the detecting sections (50, 70, 80).

Since the brake-oriented power source (60) has been commonly utilized enabling there to be only one thereof, and since each of the brake devices (30, 30A, 30B) has been provided with the detecting section (50, 70, 80) in this way, the brake device (30, 30A, 30B) which is faulty can be specified while suppressing costs. Moreover, by using the communication circuit section (42) provided to the position detecting section (32) to transmit to the brake control device (36) the detection signal detected by the detecting section (50, 70, 80), costs can be further suppressed.

The brake control device (36, 36A, 36B) may include: a switch (62) that switches whether or not to supply the brake coil (22) of a plurality of the brake devices (30, 30A, 30B) with a current from the brake-oriented power source (60); and a brake drive control section (64) that controls the switch (62) to release braking of the rotating shaft (35) of a plurality of the motors (34). Since the switch (62) and the brake drive control section (64) can also be commonly utilized in this way, costs can be further suppressed.

The detecting section (50, 70, 80) may be a current detecting section (50) that detects the brake current (Ib). The brake control device (36) may include a voltage detecting section (66) that detects the brake voltage (Vb) of the brake coil (22) of a plurality of the brake devices (30). The fault specifying section (68) may specify the faulty brake device (30) based on a plurality of the brake currents (Ib) detected by a plurality of the current detecting sections (50) and the brake voltage (Vb) detected by the voltage detecting section (66). Since the brake-oriented power source (60) and the voltage detecting section (66) have been commonly utilized enabling there to be only one of each, and since each of the brake devices (30) has been provided with the current detecting section (50) in this way, the brake device (30) which is faulty can be specified while suppressing costs.

The detecting section (50, 70, 80) may be a voltage detecting section (70) that detects the brake voltage (Vb). The brake control device (36A) may include a current detecting section (72) that detects a current (IS) flowing into the brake coil (22) of a plurality of the brake devices (30A) from the brake-oriented power source (60). The fault specifying section (68) may specify the faulty brake device (30A) based on a plurality of the brake voltages (Vb) detected by a plurality of the voltage detecting sections (70) and the current (IS) detected by the current detecting section (72). Since the brake-oriented power source (60) and the current detecting section (72) have been commonly utilized enabling there to be only one of each, and since each of the brake devices (30A) has been provided with the voltage detecting section (70) in this way, the brake device (30A) which is faulty can be specified while suppressing costs.

The detecting section (50, 70, 80) may include a current detecting section (50) that detects the brake current (Ib) and a voltage detecting section (80) that detects the brake voltage (Vb). The fault specifying section (68) may specify the faulty brake device (30B) based on a plurality of the brake currents (Ib) detected by a plurality of the current detecting sections (50) and a plurality of the brake voltages (Vb) detected by a plurality of the voltage detecting sections (80). Since the brake-oriented power source (60) has been commonly utilized enabling there to be only one thereof, and since each of the brake devices (30B) has been provided with the current detecting section (50) and the voltage detecting section (80) in this way, the brake device (30B) which is faulty can be specified while suppressing costs.

The detecting section (50, 70, 80) may include a shunt resistor. The insulating circuit section (52) may be an insulating-type A/D converter.

The detecting section (50, 70, 80) and the insulating circuit section (52) may be configured by a Hall element-type sensor.

Second Technical Idea

A method of fault detection is a method by which a brake control system (38, 38A, 38B) detects a fault of a brake device (30, 30A, 30B), the brake control system (38, 38A, 38B) including: a plurality of motors (34) each provided with the brake device (30, 30A, 30B) and a position detecting section (32), the brake device (30, 30A, 30B) having a brake coil (22) and releasing braking of a rotating shaft (35) of the motor (34) by electrification of the brake coil (22), and the position detecting section (32) detecting a rotational position of the rotating shaft (35); and a brake control device (36, 36A, 36B) that controls a plurality of the brake devices (30, 30A, 30B) using one brake-oriented power source (60). The method of fault detection includes: a detecting step by which a detecting section (50, 70, 80) provided to each of a plurality of the brake devices (30, 30A, 30B) detects at least one of a brake current (Ib) flowing through the brake coil (22) and a brake voltage (Vb) applied to the brake coil (22); a transmitting step by which the position detecting section (32), as well as transmitting the detected rotational position to the brake control device (36, 36A, 36B), acquires via an insulating circuit section (52) a plurality of detection signals detected in the detecting step and transmits an acquired plurality of the detection signals to the brake control device (36, 36A, 36B); and a fault specifying step by which a fault specifying section (68) of the brake control device (36, 36A, 36B) specifies the faulty brake device (30, 30A, 30B) based on a plurality of the detected signals detected in the detecting step.

Since the brake-oriented power source (60) has been commonly utilized enabling there to be only one thereof, and since the detecting section (50, 70, 80) provided to each of the brake devices (30, 30A, 30B) detects at least one of the brake current (Ib) and the brake voltage (Vb) in this way, the brake device (30, 30A, 30B) which is faulty can be specified while suppressing costs. Moreover, by using the position detecting section (32) to transmit to the brake control device (36) the detection signal detected by the detecting section (50, 70, 80), costs can be further suppressed.

The brake control device (36, 36A, 36B) may include a switch (62) that switches whether or not to supply the brake coil (22) of a plurality of the brake devices (30, 30A, 30B) with a current from the brake-oriented power source (60). The method of fault detection may include a releasing step by which a brake drive control section (64) of the brake control device (36) controls the switch (62) to release braking of the rotating shaft (35) of a plurality of the motors (34). Since the switch (62) and the brake drive control section (64) can also be commonly utilized in this way, costs can be further suppressed.

The method of fault detection may include a second detecting step by which a voltage detecting section (66) provided to the brake control device (36) detects the brake voltage (Vb) of the brake coil (22) of a plurality of the brake devices (30). The detecting section (50, 70, 80) may be a current detecting section (50), and the detecting step may have the brake current (Ib) detected by the current detecting section (50). The fault specifying step may specify the faulty brake device (30) based on a plurality of the brake currents (Ib) detected in the detecting step and the brake voltage (Vb) detected in the second detecting step. Since the brake-oriented power source (60) and the voltage detecting section (66) have been commonly utilized enabling there to be only one of each, and since the current detecting section (50) provided to each of the brake devices (30) detects the brake current (Ib) in this way, the brake device (30) which is faulty can be specified while suppressing costs.

The method of fault detection may include a second detecting step by which a current detecting section (72) provided to the brake control device (36A) detects a current (IS) flowing into the brake coil (22) of a plurality of the brake devices (30A) from the brake-oriented power source (60). The detecting section (50, 70, 80) may be a voltage detecting section (70), and the detecting step may have the brake voltage (Vb) detected by the voltage detecting section (70). The fault specifying step may specify the faulty brake device (30A) based on a plurality of the brake voltages (Vb) detected in the detecting step and the current (IS) detected in the second detecting step. Since the brake-oriented power source (60) and the current detecting section (72) have been commonly utilized enabling there to be only one of each, and since the voltage detecting section (70) provided to each of the brake devices (30A) detects the brake voltage (Vb) in this way, the brake device (30A) which is faulty can be specified while suppressing costs.

The detecting section (50, 70, 80) may include a current detecting section (50) and a voltage detecting section (80). The detecting step may have the brake current (Ib) and the brake voltage (Vb) detected by the current detecting section (50) and the voltage detecting section (80). The fault specifying step may specify the faulty brake device (30B) based on a plurality of the brake currents (Ib) and a plurality of the brake voltages (Vb) detected in the detecting step. Since the brake-oriented power source (60) is commonly utilized enabling there to be only one thereof, and since the current detecting section (50) and the voltage detecting section (80) provided to each of the brake devices (30B) detect the brake current (Ib) and the brake voltage (Vb) in this way, the brake device (30B) which is faulty can be specified while suppressing costs.

The present invention is not limited to the above-described embodiment, and various modifications can be made without departing from the gist of the present invention.

What is claimed is:

1. A brake control system comprising:
   a plurality of motors each provided with a brake device and a position detecting section; and
   a brake control device that controls a plurality of the brake devices using one brake-oriented power source,
   the position detecting section including:
   a position detecting circuit section that detects a rotational position of a rotating shaft of the motor; and
   a communication circuit section that transmits the rotational position to the brake control device,
   the brake device including:
   an electromagnetic brake that has a brake coil and releases braking of the rotating shaft of the motor by electrification of the brake coil;
   a detecting section that detects at least one of a brake current flowing through the brake coil and a brake voltage applied to the brake coil; and
   an insulating circuit section provided between the detecting section and the communication circuit section in order to electrically insulate the detecting section and the communication circuit section and transmit to the brake control device via the communication circuit section a detection signal detected by the detecting section, and
   the brake control device comprising a fault specifying section that specifies a faulty brake device based on a plurality of detection signals detected by a plurality of the detecting sections.

2. The brake control system according to claim 1, wherein the brake control device comprises:
   a switch that switches whether or not to supply the brake coil of a plurality of the brake devices with a current from the brake-oriented power source; and
   a brake drive control section that controls the switch to release braking of the rotating shaft of a plurality of the motors.

3. The brake control system according to claim 1, wherein the detecting section is a current detecting section that detects the brake current,
   the brake control device comprises a voltage detecting section that detects the brake voltage of the brake coil of a plurality of the brake devices, and the fault specifying section specifies the faulty brake device based on a plurality of the brake currents detected by a plurality of the current detecting sections and the brake voltage detected by the voltage detecting section.

4. The brake control system according to claim 1, wherein
the detecting section is a voltage detecting section that detects the brake voltage,
the brake control device comprises a current detecting section that detects a current flowing into the brake coil of a plurality of the brake devices from the brake-oriented power source, and
the fault specifying section specifies the faulty brake device based on a plurality of the brake voltages detected by a plurality of the voltage detecting sections and the current detected by the current detecting section.

5. The brake control system according to claim 1, wherein
the detecting section includes a current detecting section that detects the brake current and a voltage detecting section that detects the brake voltage, and
the fault specifying section specifies the faulty brake device based on a plurality of the brake currents detected by a plurality of the current detecting sections and a plurality of the brake voltages detected by a plurality of the voltage detecting sections.

6. The brake control system according to claim 1, wherein
the detecting section includes a shunt resistor, and
the insulating circuit section is an insulating-type A/D converter.

7. The brake control system according to claim 1, wherein
the detecting section and the insulating circuit section are configured by a Hall element-type sensor.

8. A method of fault detection by which a brake control system detects a fault of a brake device, the brake control system comprising:
a plurality of motors each provided with the brake device and a position detecting section, the brake device having a brake coil and releasing braking of a rotating shaft of the motor by electrification of the brake coil; and the position detecting section detecting a rotational position of the rotating shaft; and
a brake control device that controls a plurality of the brake devices using one brake-oriented power source, the method including:
a detecting step by which a detecting section provided to each of a plurality of the brake devices detects at least one of a brake current flowing through the brake coil and a brake voltage applied to the brake coil;
a transmitting step by which the position detecting section, as well as transmitting the detected rotational position to the brake control device, acquires via an insulating circuit section a plurality of detection signals detected in the detecting step and transmits an acquired plurality of the detection signals to the brake control device; and
a fault specifying step by which a fault specifying section of the brake control device specifies a faulty brake device based on a plurality of the detected signals detected in the detecting step.

9. The method of fault detection according to claim 8, wherein
the brake control device includes a switch that switches whether or not to supply the brake coil of a plurality of the brake devices with a current from the brake-oriented power source, and
the method includes a releasing step by which a brake drive control section of the brake control device controls the switch to release braking of the rotating shaft of a plurality of the motors.

10. The method of fault detection according to claim 8, including
a second detecting step by which a voltage detecting section provided to the brake control device detects the brake voltage of the brake coil of a plurality of the brake devices,
wherein the detecting section is a current detecting section,
the detecting step has the brake current detected by the current detecting section, and
the fault specifying step specifies the faulty brake device based on a plurality of the brake currents detected in the detecting step and the brake voltage detected in the second detecting step.

11. The method of fault detection according to claim 8, including
a second detecting step by which a current detecting section provided to the brake control device detects a current flowing into the brake coil of a plurality of the brake devices from the brake-oriented power source,
wherein the detecting section is a voltage detecting section,
the detecting step has the brake voltage detected by the voltage detecting section, and
the fault specifying step specifies the faulty brake device based on a plurality of the brake voltages detected in the detecting step and the current detected in the second detecting step.

12. The method of fault detection according to claim 8, wherein
the detecting section includes a current detecting section and a voltage detecting section,
the detecting step has the brake current and the brake voltage detected by the current detecting section and the voltage detecting section, and
the fault specifying step specifies the faulty brake device based on a plurality of the brake currents and a plurality of the brake voltages detected in the detecting step.

* * * * *